ARMSTRONG & JEFFCOAT.
Hay Rake and Loader.
No. 86,345.
Patented Feb. 2, 1869.
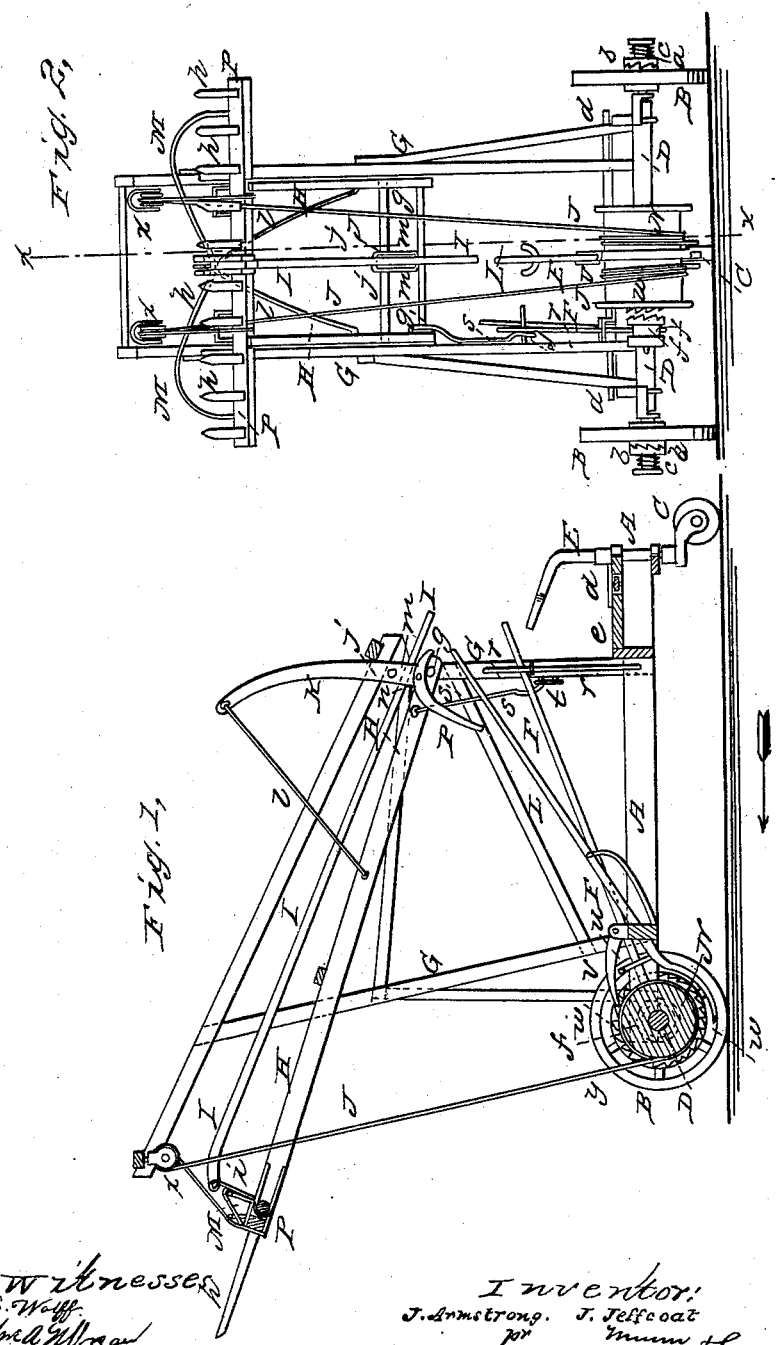

JAMES ARMSTRONG AND JOHN JEFFCOAT, OF ONAWA, IOWA.

*Letters Patent No. 86,345, dated February 2, 1869.*

IMPROVEMENT IN HAY-RAKERS AND LOADERS.

The Schedule referred to in these Letters Patent and making part of the same

*To all whom it may concern:*

Be it known that we, JAMES ARMSTRONG and JOHN JEFFCOAT, of Onawa, in the county of Monona, and State of Iowa, have invented a new and improved Hay-Raker and Loader; and we do hereby declare that the following is a full, clear, and exact description thereof, which will enable those skilled in the art to make and use the same, reference being had to the accompanying drawings, forming part of this specification, in which—

Figure 1 represents a vertical longitudinal section of our improved rake and loader, the plane of section being indicated by the line $x\, x$, fig. 2.

Figure 2 is a front elevation of the same.

Similar letters of reference indicate corresponding parts.

This invention relates to a new apparatus for raking and stacking or loading hay, and is so arranged that it cannot be injured by careless operators, and which is easily operated by steam, or other motive-power.

It operates entirely automatically, and can stack hay about as quick as the same could heretofore be cocked.

The invention consists of a wagon, supported on wheels, and carrying, on a swinging bar, a rake, which can be lowered to the ground, and elevated to the height of a stack.

The rake is pivoted to the end of the swinging bar, so that it can be turned to discharge the hay, when the same is elevated.

The swinging bar is elevated by means of a rope that is wound around a drum on the main axle of the wagon, and which is thrown in gear by means of a lever.

When the rake is elevated, the drum is automatically thrown out of gear, by means of a cam turned by the swinging bar, so that the rake remains elevated as long as the driver desires.

The apparatus is steered by means of a caster-wheel, which is attached to a forked bar that can be swung by the driver's lower extremities, leaving his hands free to operate the levers and to hold the reins.

A, in the drawing, represents a horizontal frame, of suitable form and size, supported on three wheels, B B and C.

The wheels B B are hung loose on the ends of a horizontal axle, D, which has its bearings in the front part of the frame.

Each wheel, B, has a ratchet or toothed wheel, $a$, on its hub, which mesh into the toothed faces of sliding clutch-wheels $b\, b$, fitted upon polygonal grooved or feathered portions of the axle, and held against the wheels $a\, a$, by means of springs $c\, c$, as shown in fig. 2.

The wheels $a$ and $b$ are so toothed, that when the apparatus is moved forward in the direction of the arrow, shown in fig. 1, the axle will be turned by the action of the wheels B, while, when the apparatus is moved backward, the wheels $a$ and $b$ will slip on each other, and the axle will remain unmoved.

The wheel C is hung in the lower end of a vertical rod, E, which is fitted through the rear part of the frame A.

The team to draw the machine is fastened to the ends of a whiffle-tree, $d$, pivoted to the rear part of the frame, and will thus travel at the side of the machine.

The driver occupies a position on the rear platform, $e$, of the frame, and steers the same with his thigh by means of the forked upper end of the lever E.

N is a drum, hung loose on the axle D, near the middle of the same.

It has teeth on one side, so that it can, by means of a clutch, $f$, which is fastened to a lever, F, be thrown in gear with the axle, to revolve with the same.

Upon the horizontal frame A is set, and securely fastened, an upright frame, G, to the rear part of which, by means of a pin, $g$, a swinging frame, H, is pivoted.

To the front end of the frame H is pivoted the rake-head P, which is as long as the whole apparatus is wide, and from which tines, $h\, h$, of suitable construction project.

To the rake-head are secured the ends of cords J J, which are fitted over rollers $x$, arranged on the front part of the upper frame G, and which are, with their other ends, fastened to the drum F.

When the machine is moved forward, and when the drum is in gear with the axle, the ropes J are wound around the drum, so as to elevate the rake.

From the rake-head projects an arm, $i$, to which the front end of a lever, I, is pivoted.

$j$ is a horizontal arbor, having its bearings in the frame G, somewhat above the pivot $g$, as shown.

From this arbor projects upward a long curved arm, $k$, which is, by means of braces $l\, l$, connected with the frame H, and which thereby, as the frame H is swung up or down, imparts corresponding oscillating motion to the arbor $j$.

From the arbor $j$ project downward lugs $m\, m$, which are connected by means of two horizontal pins $n$ and $o$.

The rear end of the lever I rests on the upper pin $n$, and has a notch, so as to be held by the said pin, as indicated in fig. 1.

The lower pin $o$ holds a bent bar, $p$, by means of which the lever I can be lifted off the pin $n$.

The lever I will therefore, when the frame H swings up, also swing around the pin $n$, while the pin $n$ itself swings at the same time around the pin $j$.

By this peculiar connection, the rake is kept in a horizontal position while it is being elevated.

When raised, the loaded rake can be dumped by means of the lever I, which is then raised off the pin $n$, and pushed forward to swing the rake-head in its bearings.

The lever F is, by a vertical pin, pivoted to a front cross-bar, $p$, of the frame A or G, and extends back.

Its rear end is, by a spring, $r$, pressed away from a rod, $s$, which is suspended from the frame H, and which is, with its lower end, fastened to a bar, *t*, that is pivoted to the frame G, as shown in fig. 2.

When the rake is down, the arm *t* is in a nearly vertical position, so that the spring *r* can push the lever F far enough to bring the clutch away from the drum, and to thereby hold the latter out of gear.

To bring it in gear, the driver has invariably to swing the lever against the spring.

While the rake is being elevated, the arm *t* is gradually turned, so that it will, when the rake is up, be in a nearly horizontal position, and will then have swung the rod *s* so far toward the lever F as to carry the latter, with its clutch, out of gear with the drum, against the power of the driver, if the latter should forget to disengage the clutch.

Thus the drum is automatically thrown out of gear as soon as the rake is elevated, and is held out of gear until the lever F is again moved by hand to connect the clutch.

L is a lever, pivoted to the front part of the main frame, and provided with a bent lower end, which is under the drum, as shown.

From the lever L projects an arm, *u*, by which a pawl, *v*, that fits into a ratchet-wheel, *w*, on the drum, can be raised.

The pawl *v* will always be on the wheel, and will prevent the rope J from unwinding when the same is thrown out of gear with the axle.

Only when the lever L is moved, can the pawl be raised, and will then allow the rake to be lowered by its own weight.

The lower bent end of the lever will then be pressed against the drum, to create friction to prevent the too rapid descent of the rake, and consequent injury of parts.

M is a spring-wire, fastened upon the rake-head, and steadied on the lug or arm *i*, as shown.

It serves not only to retain the hay on the rake-head, but also to make the strings J J elastic and yielding, to prevent injury of parts, or loss of hay by shocks.

When in operation, the rake is lowered to the ground, and the drum N out of gear, and the machine drawn or pushed forward along a windrow or over the mowed ground.

When two hundred to five hundred pounds are gathered on the rake, the lever F is swung to throw the drum into gear.

The drum is then revolved, and elevates the rake.

When it has been raised, the rake is dumped by means of a lever, I, and then the lever L is moved to let the rake down again.

We claim as new, and desire to secure by Letters Patent—

1. The arrangement of the drum N, swinging frame H, rake P *h*, pulley *x*, and rope J, as herein described, for the purpose specified.

2. The combination of the drum N, rope J, swinging frame H, rake P, and lever I, with the frame G, arranged as described, for the purpose specified.

3. The combination of the rake-head P, lug *i*, and lever I, with the arbor *j*, arm *k*, pin *n*, and swinging frame H, all arranged and operating as described, for the purpose of keeping the rake in a horizontal position while it is being elevated, as set forth.

4. The lever F, spring *r*, bar *t*, and rod *s*, in combination with the drum N and swinging frame H, arranged to operate in the manner described, for the purpose specified.

5. The lever L, for raising the pawl *v*, and for applying a brake to the drum N, substantially as herein shown and described.

6. The spring M, for retaining the load on the rake, and for making the ropes T elastic, as set forth.

JAMES ARMSTRONG.
JOHN JEFFCOAT.

Witnesses:
JAMES WALKER,
GEORGE E. WARNER.